Dec. 6, 1932.  J. A. LENTZ  1,889,900

VALVE

Filed Jan. 11, 1930

INVENTOR.
Joseph Allan Lentz.
BY
Thomas W. J. Clark
ATTORNEYS.

Patented Dec. 6, 1932

1,889,900

UNITED STATES PATENT OFFICE

JOSEPH ALLAN LENTZ, OF BALTIMORE, MARYLAND

VALVE

Application filed January 11, 1930. Serial No. 420,244.

The objects of my invention are to build a valve especially for use as a blow-off valve for use on locomotive boilers, though it obviously may be used in many other applications. In locomotive boilers, steam, water and sludge must be let out under great pressure, and yet the seal must be tight when the valve is closed. When the boiler is cleaned, steam, water and a gritty sludge are let out under pressure and great damage is done to the valves now in use.

In my valve, I have placed a valve which takes most of the wear, which closes under pressure and which approaches its seat from a right angled direction, and which therefore not only wears less than a sliding valve, but comes to a full opening and full closing faster, and which allows the abrading material to be carried from the valve seat by the fluid under pressure before the valve closes tightly. I also place a sealing valve further along in the passage of fluid flow, which valve acts after the first valve has closed, and which therefore closes without the presence of material or pressure, and which is therefore not subject to "wire-drawing". The two valves are so designed that the sealing valve is withdrawn into a recess in the first, or cut-off, valve, so that the passage of material through the valve will touch only the cut-off valve and not abrade or cut the sealing valve. The cut-off valve, when opened all the way, is very nearly out of the path of the flow of material. The sealing valve is also free floating in its mounting, thus insuring a snug fit on its seat at all times. Thus the cut-off valve stops the material flow and receives the wear, and the sealing valve, being protected, makes a tight seal. Oftentimes two valves are required, and my valve combines two valves in one at a greatly reduced cost.

The unitary operating mechanism of the valves opens first the sealing valve, and draws it to its protected position in the cut-off valve before the latter is opened, and reversely, the cut-off valve is first closed before the sealing valve leaves its recess in the cut-off valve and is forced to its sealing position.

Other objects and advantages of the valve will be apparent from the following detailed description and the accompanying drawing, in which, Figure 1 is a vertical partial sectional view of the valve.

In the drawing similar numerals refer to similar parts throughout the several views.

Figure 1:
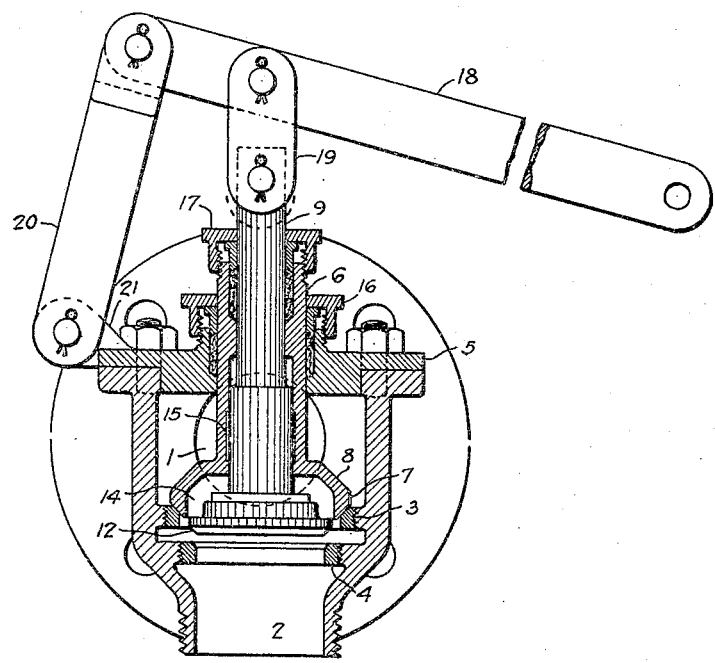
Figure 2:
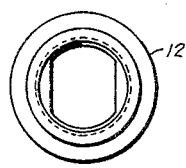
Fig. 2 is a plan view of the floating sealing valve head.
Figure 3:
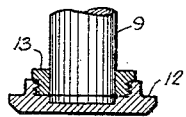
Fig. 3 is a vertical sectional view of the floating sealing valve.
Figure 4:
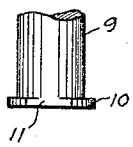
Fig. 4 is a detail view of the valve stem.

1 is the inlet for the valve passage way through which fluid enters and 2 is the outlet, or discharge port of the valve. Upper valve seat 3 and lower valve seat 4 are preferably of the removable type, as shown.

Through the bonnet 5 of the valve, valve stem 6 of tubular structure passes. This valve stem 6 has at its end cut-off valve 7 which seats on valve seat 3. The upper edge of this valve is tapered, as at 8, so that the inflow of material into the valve tends to close the valve.

Inside of valve stem 6 is another valve stem 9 which has a flange 10 at its lower end, which is partly cut away, as at 11, and which fits loosely, but unrevolvably into the top of sealing valve 12. Retaining ring 13 holds the valve on the stem. This valve seats on valve seat 4. This mounting makes possible a free seating of the valve, but at the same time allows the valve and seat to be ground without removal, or without other mechanism.

The under side of valve 7 is cut out as at 14, so that valve 12 may be drawn up into it. When valve 12 is so drawn up into valve 7, the passing material will at most contact with the face of valve 12, but not with the oblique valve seat on the valve, which will consequently be protected from the wear of passing material. The inside of valve stem 6 is cut away, as at 15, to decrease the friction for the valve stem 9. Valve stem 6 works in a packing gland 16 on bonnet 5, and valve stem 9 works in a packing gland 17 on valve stem 6.

Lever 18 is connected to stem 9 by link 19, and to bonnet 5, by link 20 and lugs 21. Upon raising lever 18, first valve 12 is unseated and drawn into recess 14, then valve 7 is raised. Upon lowering the lever, both the friction between the valve stems and the flow of material closes valve 7, and until it is closed, valve 12 retains its protected position, but upon its closing, valve 12 is forcefully seated, and due to its floating nature and since no fluid under pressure or material passes after closing valve 7, valve 12 seats securely. Valve 7 may be closed half-way forcefully by link 19 striking packing gland 17.

Should the lever or valves or other mechanism break, pressure would close either or both valves, depending on the amount of the pressure and where the break occurred and whether valve 7 leaks enough to seat valve 12. Likewise, should a particle prevent the closing of either valve, the other may be closed.

When the valves are opened, a full opening is obtained, and this opening may be made suddenly, and the closing may likewise be made suddenly, so that with great force the material in the boiler may be discharged, and therefore the cleaning may be thoroughly done, with a minimum loss of pressure in the boiler. Should material collect in the boiler during operation of the locomotive, it may be discharged without stopping and without undue loss of pressure. Should the valve 7 float from its seat, immediately upon opening valve 12, even slightly, the rush of material will force valve 7 closed and valve 12 may then be opened free of further pressure.

The size, shape, proportion and structural details of the invention may obviously be varied within considerable limits without departing from the spirit of the invention as defined in the following claims.

I claim:

1. In a valve, a fluid passage therethrough, a cut-off valve extending across said passage adjacent the inlet thereof adapted to be closed by the flow of fluid therethrough, a sealing valve extending across said passage adjacent the outlet thereof, unitary means to open first said sealing valve, then said cut-off valve.

2. In a valve, a fluid passage therethrough, a cut-off valve extending across said passage adjacent the inlet thereof adapted to be closed by the flow of fluid therethrough, a sealing valve extending across said passage adjacent the outlet thereof, means to forcefully close said sealing valve after the closing of said cut-off valve and unitary means to first open said sealing valve, then said cut-off valve.

3. In a valve, a fluid passage therethrough, a cut-off valve extending across said passage adjacent the inlet thereof, a sealing valve extending across said passage adjacent the outlet thereof, said valves being mounted on concentric stems extending from said passage and being reciprocable in the direction of fluid discharge and said cut-off valve being adapted to make fluid-tight contact with its seat because of the pressure of the fluid.

4. In a valve, a fluid passage therethrough, a cut-off valve extending across said passage adjacent the inlet thereof, a sealing valve extending across said passage adjacent the outlet thereof, said valves being mounted on concentric stems extending from said passage and being reciprocable in the direction of fluid discharge and means to forcefully close said sealing valve through part of its movement, and for the rest of its movement said valve being adapted to close fluid-tight because of the pressure of the fluid.

5. In a valve, a fluid passage therethrough, a cut-off valve extending across said passage adjacent the inlet thereof, a sealing valve extending across said passage adjacent the outlet thereof, said valves being mounted on concentric stems extending from said passage and being reciprocable in the direction of fluid discharge, means connected with said stems to positively open said valves and said cut-off valve being adapted to make fluid-tight contact with its seat because of the pressure of the fluid.

6. In a valve, a fluid passage therethrough, a cut-off valve extending across said passage adjacent the inlet thereof, a sealing valve extending across said passage adjacent the outlet thereof, said valves being mounted on concentric stems extending from said passage and being reciprocable in the direction of fluid discharge, means connected with said stems to positively open said valves and to close said sealing valve and said cut-off valve being adapted to make fluid-tight contact with its seat because of the pressure of the fluid.

7. In a valve, a fluid passage therethrough, a cut-off valve extending across said passage adjacent the inlet thereof, a sealing valve extending across said passage adjacent the outlet thereof, said valves being mounted on concentric stems extending from said passage and being relatively freely reciprocable in the direction of fluid discharge, and means, some operating on said stems, to open and close either or both of said valves.

8. In a valve, a fluid passage therethrough, a cut-off valve extending across said passage adjacent the inlet thereof, the side toward the fluid inlet of said valve when the same is closed being substantially surrounded by said fluid passage, a sealing valve extending across said passage adjacent the outlet thereof, said valves being mounted on concentric stems extending from said passage and being reciprocable in the direction of fluid discharge, said sealing valve moving freely to make fluid-tight contact with its seat because of the pressure of the fluid.

JOSEPH ALLAN LENTZ.